United States Patent Office 3,321,974
Patented May 30, 1967

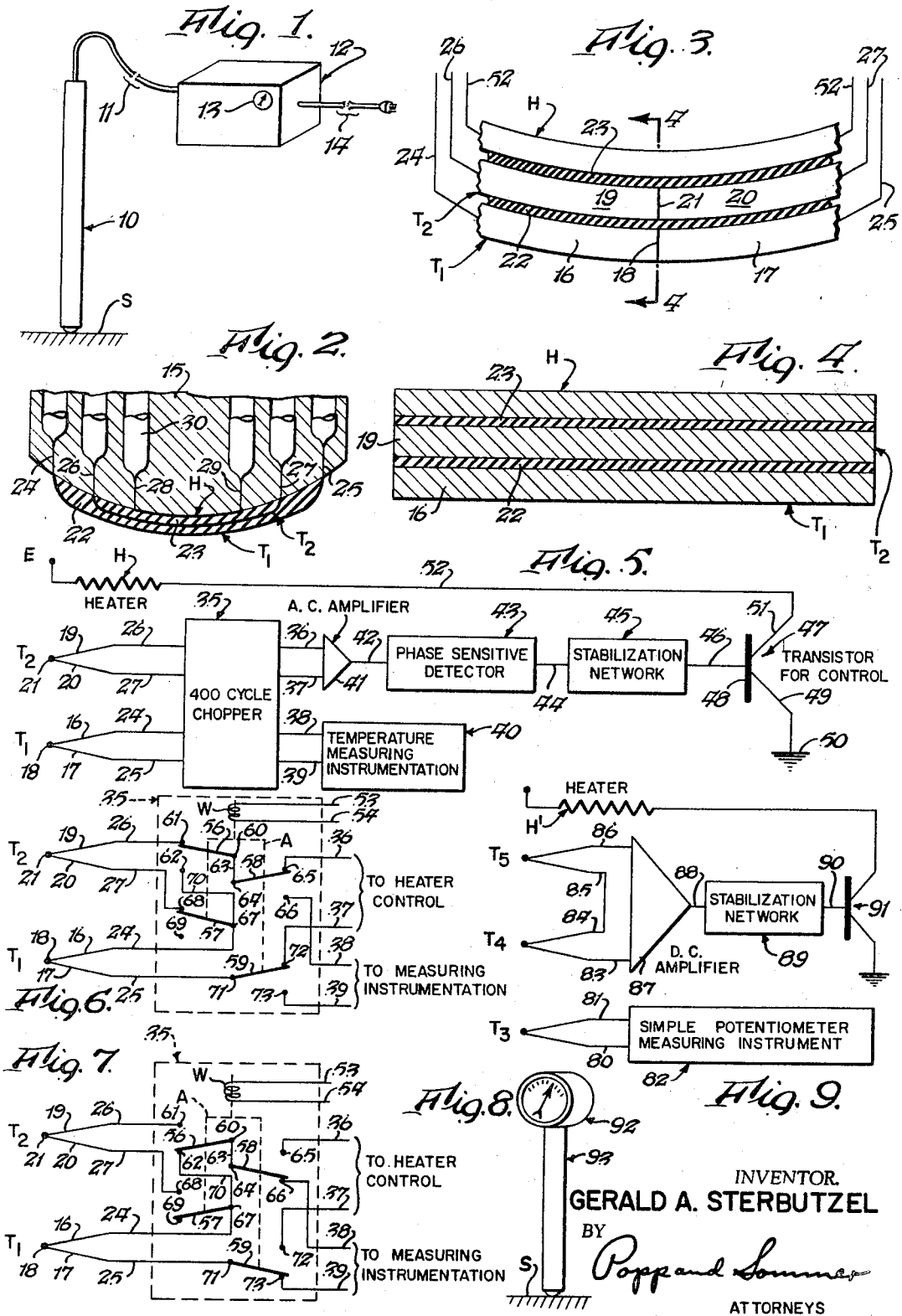

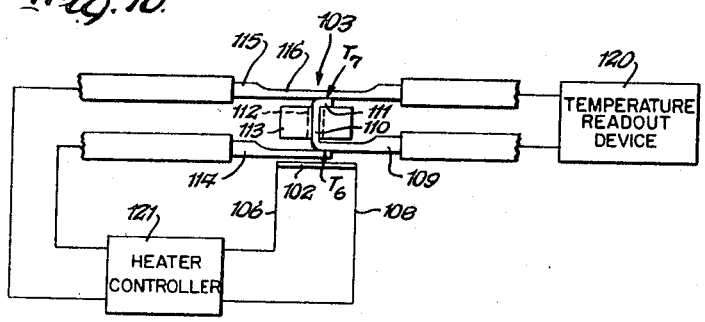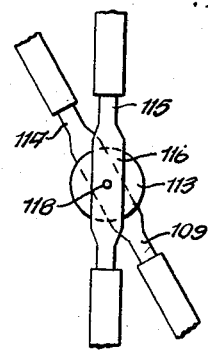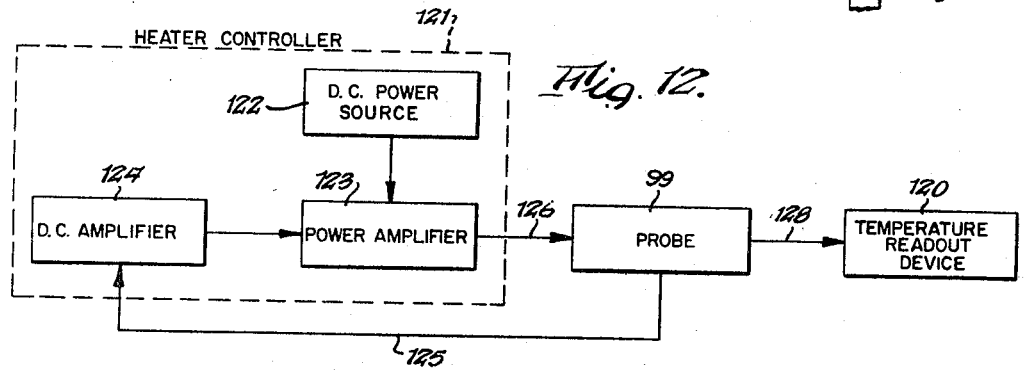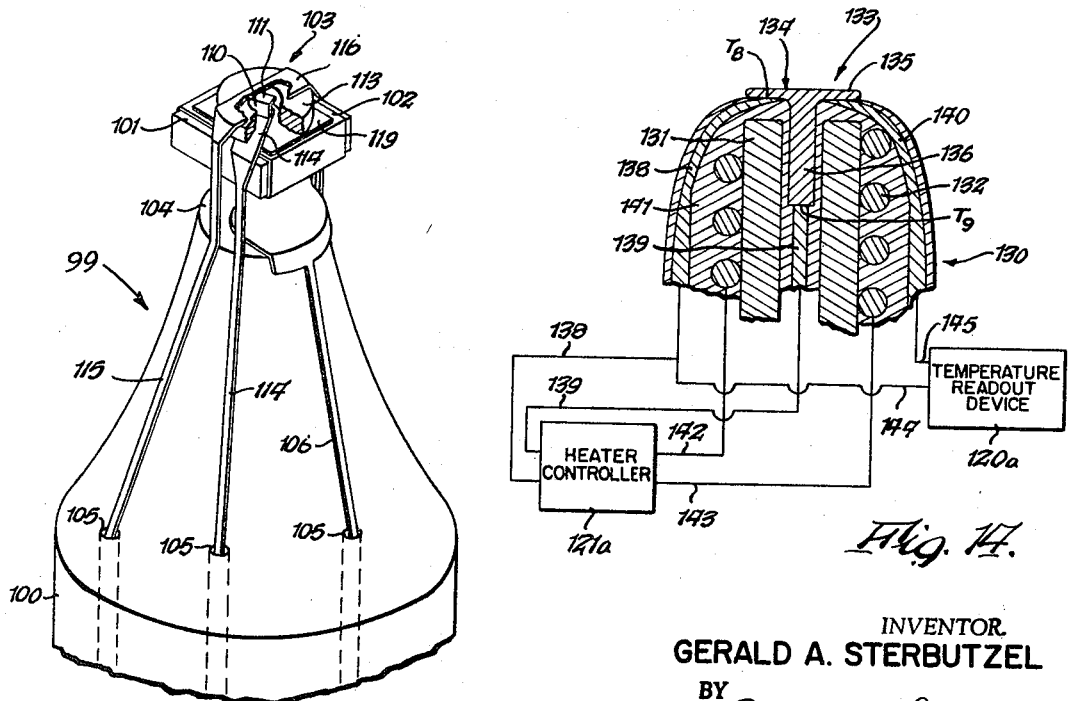

3,321,974
SURFACE TEMPERATURE MEASURING DEVICE
Gerald A. Sterbutzel, Depew, N.Y., assignor to Cornell Aeronautical Laboratory, Inc., Buffalo, N.Y., a corporation of New York
Filed Oct. 23, 1965, Ser. No. 519,804
20 Claims. (Cl. 73—359)

This application is a continuation-in-part of application 219,894, filed August 28, 1962 and now abandoned.

This invention relates to improvements in a device adapted to contact a surface and quickly and accurately measure its true temperature.

There are known devices for measuring the temperature of a surface. However, no such device seems to be available which has a truly accurate performance and operational convenience. The prior art devices have serious drawbacks which render them useless or at least inconvenient when accurate performance is required. One prior art practice considered of simply attaching a thermocouple to the surface. Under certain limited cirucmstances, such an installation can be adequate. It normally has the inherent disadvantage of introducing modification or disturbance of the surface and modification of the heat transfer quality of the surface. This alters the temperature measured which may also be made inaccurate by lead losses. Other prior art techniques such as the use of resistance thermometers for measuring surface temperatures had equally serious difficulties, quite often ranging from the inability to measure local spot temperatures to problems of errors caused by the requirement that the measuring element be insulated from the surface. Other types of equipment for making such measurements, such as radiation or optical instruments, often required high temperatures or constant emissivity characteristics of the surface. All of these disadvantages are overcome by the surface temperature measuring device embodying the present invention.

The primary object of the present invention is to provide a surface temperature measuring device which minimizes heat flow from the surface contacted and thereby premits the true temperature of the surface to be measured.

Another important object is to provide such a device in which the size and heat capacity of the temperature sensing element is small so that little heat flow and temperature distortion are involved.

Another object is to provide such a device in which the response of the temperature sensing element is fast so that temperature adjustment will occur rapidly, again minimizing heat flow temperature disturbance.

A further object is to provide such a device in which heat flow away from the temperature sensing element to other parts of the device is minimized, again minimizing distortion of the surface temperature.

Still another object is to provide such a device which is small and compact in size and thereby is particularly advantageously useful in environments in which convection and radiation effects are large so that temperature distortion will be minimized.

Another object is to provide such a device which is capable of directly indicating the temperature measured for readout or recording.

A further aim is to provide such a device which is capable of measuring many locations on a surface in a short time, employing the same device.

Another object is to provide such a device which requires no modification or adaptation of the surface the temperature of which is to be measured.

Another object is to provide such a device which can be operated in various temperature ranges.

Still other objects and advantages of the present invention will be apparent from the following detailed description of embodiments thereof taken in conjunction with the accompanying drawings in which:

FIG. 1 is a schematic perspective view of a surface temperature measuring device constructed in accordance with the principles of the present invention and showing the same associated with a surface the true temperature of which is to be measured by the device, such device being further characterized as requiring an outside electrical input for its operation.

FIG. 2 is a greatly enlarged fragmentary vertical sectional view of the lower end of the probe forming part of the device shown in FIG. 1.

FIG. 3 is a still further enlarged fragmentary vertical schematic view of certain parts illustrated in FIG. 2.

FIG. 4 is a vertical transverse sectional view thereof taken on line 4—4 of FIG. 3.

FIG. 5 is a wiring diagram, schematic in nature, of the device shown in FIG. 1.

FIG. 6 is a detailed illustration of the chopper illustrated diagrammatically in FIG. 5 and showing the movable elements of such chopper in one position to represent the arrangement of the thermocouples for heater control.

FIG. 7 is a view similar to FIG. 5 but representing the chopper in another position for temperature measuring purposes.

FIG. 8 is a perspective view, more or less schematic, of a surface temperature measuring device embodying a modified form of the present invention, characterized by not requiring an outside electrical source for its operation.

FIG. 9 is a circuit diagram of a schematic nature of the device shown in FIG. 8.

FIG. 10 is a partially schematic side elevational view of another form of sensor and heater with associated apparatus, constituting another embodiment of the invention.

FIG. 11 is a fragmentary top plan view of the sensor shown in FIG. 10.

FIG. 12 is a block diagram of the system in which the device shown in FIG. 10 is used.

FIG. 13 is an enlarged fragmentary perspective view of a probe including the sensor and heater shown in FIG. 10.

FIG. 14 is an enlarged fragmentary longitudinal sectional view of another form of probe having a different construction of sensor and heater and shown with associated apparatus, constituting yet another embodiment means movably mounting said armature; said armature of the invention.

FIGS. 1–7

Referring to FIG. 1, the inventive surface temperature measuring device is shown as comprising a thin pencil-like probe 10 connected by a series of flexible conductors ganged together to form a cable represented generally at 11, to a box of equipment represented generally at 12 housing suitable components hereinafter explained including a temperature measuring indicator represented at 13, and supplied by an operating electric current through a plug-in type power cable 14.

The probe 10 is shown as comprising an elongated cylindrical support 15 made of suitable rigid insulating material. The lower end of this support 15 is shown as carrying, in the embodiment illustrated in FIGS. 1–7, a first or measuring thermocouple $T_1$, a second or reference thermocouple $T_2$, and a heater H. Referring to FIG. 3, the thermocouple $T_1$ is shown as including elements or wires 16 and 17 of dissimilar metals connected together in a well known manner to provide a hot junction therebetween indicated at 18. Similarly, the thermocouple $T_2$ is composed of elements or wires 19 and 20 of dissimilar metals to provide therebetween a hot junction 21. Any suitable combination of metals such as iron-constantan, copper-constantan, Chromel-Alumel and the like may be used for the thermocouple elements or wires. As is well known, when the hot junction of a thermocouple is heated a voltage proportionate to the temperature sensed is generated across the terminals of the thermocouple.

A layer of heat pervious electrical insulation 22 is shown as arranged between the thermocouples $T_1$ and $T_2$ and in direct contact with each, and a similar layer of insulation 23 is shown as arranged between the thermocouple $T_2$ and the heater H and in direct contact with each. The remote ends of the elements 16 and 17 of the thermocouple $T_1$ are shown as having lead wires 24 and 25, respectively. In a similar manner, the elements 19 and 20 of the thermocouple $T_2$ have lead wires 26 and 27, respectively. The heater H which preferably is an electrical heating element made of suitable material is shown as having a lead wire 28 at one end and a lead wire 29 at its other end. Referring to FIG. 2, these lead wires 24–29 are severally connected to suitable other lead wires, one of which is typically represented at 30 which extend longitudinally through the probe support or body member 15. As they leave the upper end of this probe, the various conductors 30 are unitized into the flexible cable 11.

The assembly of thermocouples $T_1$ and $T_2$ and heater H is preferably arched or crowned, as shown in FIGS. 2 and 3, so that the hot junction 18 is a salient part of the measuring device and adapted to contact a surface such as the surface S shown in FIG. 1 the true temperature of which is to be measured.

In accordance with the inventive concept, it is important that the thermocouples $T_1$ and $T_2$ are in conductive heat exchange relationship with each other by reason of these thermocouples contacting the intermediate heat pervious layer 22, as shown, so that the hot junction of one can be utilized to thermally sense through thermal conduction the temperature of the other, while the hot junction of one of these thermocouples is adapted to contact the surface the temperature of which is to be measured. Also, the heater H is arranged in conductive heat exchange relation with one of the thermocouples $T_1$ and $T_2$, such as thermocouple $T_2$ through the intermediary of heat pervious layer 23 which contacts both this thermocouple $T_2$ and the heater, as shown, so that this heater is capable of heating this one thermocouple by thermal conduction which in turn supplies heat by thermal conduction to the other of these thermocouples. Thus, the thermocouples $T_1$ and $T_2$ and heater H are in conductive heat exchange relation with one another through direct contacting solid bodies.

As shown, the thermocouple $T_1$ is the lowermost instrumentality with its hot junction 18 arranged at the salient part of the crowned or arched assembly. Sandwiched between this lowermost thermocouple $T_1$ and the thermocouple $T_2$ is the layer of insulating material 22. The heater H is superposed above the thermocouple $T_2$ with the layer of insulating material 23 being arranged therebetween. As shown in FIG. 3, the hot junctions 18 and 21 are in substantial vertical alinement and the heating element H extends across the hot junction 21 of the adjacent thermocouple $T_2$.

It is important that the surface measuring device be sensitive and have fast response. This is achieved by forming the thermocouples $T_1$ and $T_2$ in the regions contiguous their respective hot junctions with a ribbon contour in cross section. The thermocouples $T_1$ and $T_2$, as well as the heater H and the two intermediate insulation layers 22 and 23 which also severally have a ribbon contour in cross section, are preferably of the same width as shown in FIG. 4. This configuration permits the hot junction of each thermocouple to be uniformly heated across the full width of the thermocouple, i.e. provides parallel heat flow, and also minimizes heat losses out the narrow side edges of the thermocouples. The width to thickness ratio of the sandwich of thermocouples $T_1$ and $T_2$ and insulation layers 22 and 23, the heater H being excluded, should be at least twenty to one. A higher ratio is preferred. This is only inaccurately suggested in the cross sectional view forming FIG. 4. Typically the thickness, or vertical dimension as viewed in FIG. 4, of each of the thermocouples $T_1$ and $T_2$ adjacent their hot junctions is 0.0002 inch or less, while the width, or horizontal dimension as viewed in FIG. 4, is about 1/16 inch.

The thickness of each of the insulation layers 22 and 23 is preferably just that which will provide the desired electrical insulative effect so as to allow heat to be transmitted therethrough. Preferably the insulation layers 22 and 23 cover completely the opposing surface areas of the thermocouples $T_1$ and $T_2$ and heater H. Typically the thickness of each of the insulation layers is less than 0.001 inch. The range of temperature which the device is to measure will determine the type of insulating material used. Any suitable insulating material may be used. For example, up to temperatures of 500° F. conventional resins employed for insulation coatings may be used. For temperatures to be measured above 500° F., silicates evaporated upon the surface of the thermocouple can be advantageously used.

Remote from the hot junctions 18 and 21, the respective thermocouples $T_1$ and $T_2$ are formed so that the cross sectional shape thereof may be adapted to suitable connection with the various lead wires 24–29.

The measuring device of the present invention operates on the principle that an outside heat source such as the heater H will make up the heat losses which otherwise would occur if only one thermocouple contacted the surface and drained heat therefrom. If the surface whose true temperature is to be measured is locally cooled by the heat given up to the measuring element contacting the surface, it is evident that a false temperature is measured. On the other hand and in accordance with the present invention the temperature sensing means contactable with the surface is heated so as to eliminate net heat flow between such means and the surface contacted. In the embodiment of FIGS. 1–7, the second thermocouple $T_2$ senses the temperature of the first thermocouple $T_1$ which contacts the surface S and the heater H heats the second thermocouple $T_2$ to the temperature of the first thermocouple $T_1$, this heater being operated in response to any difference in the temperatures severally sensed by these two thermocouples. Thus, if the temperature of thermocouple $T_2$ is equal to that of thermocouple $T_1$, it follows that the temperature of surface S is equal to that of thermocouple $T_1$. This means no heat flows between the thermocouples nor across the interface between thermocouple $T_1$ and surface S being tested.

Referring to FIG. 5, the numeral 35 represents a chopper or cyclically operated switching device adapted to connect the lead wires of the thermocouples $T_1$ and $T_2$ in a manner as hereinafter explained either with conductors 36 and 37 which control the energization of the heater H or with conductors 38 and 39 which are operatively associated with suitable temperature measuring instrumentation indicated generally at 40. Still referring to FIG. 5, conductors 36 and 37 are shown as associated with an amplifier 41 which in turn via the line 42 controls a phase sensitive detector means represented generally by the numeral 43, of any suitable construction, connected in turn via the line 44 with suitable stabilization network means represented generally by the numeral 45. The output of this means 45 is conducted via the line 46 to a transistor represented at 47. The base 48 of this transistor 47 is shown as having an emitter 49 connected to ground 50 and a collector 51 connected via the line 52 in series with the heater H on which a positive voltage E is suitably impressed.

The construction and operation of the chopper 35 is represented diagrammatically in FIGS. 6 and 7. In FIG. 6 the thermocouples $T_1$ and $T_2$ are shown as operatively associated with the heater control lines 36 and 37, whereas in FIG. 7, the measuring thermocouple $T_1$ is shown as being operatively associated with the measuring instrumentation control lines 38 and 39. Referring to FIGS. 6 and 7, the chopper 35 is shown as comprising a solenoid including a winding W having leads 53 and 54 which jointly represent the electrical power source line 14 shown in FIG. 1. If the line 14 is plugged into a source of alternating current, say 400 cycles per second, it will be seen that the solenoid is correspondingly cyclically operated. This solenoid also includes an armature A which is adapted to move a series of switch arms represented by the numerals 56, 57, 58 and 59. The switch arm 56 is pivoted at one end to the contact 60 and has its other end adapted to move between a pair of spaced contacts 61 and 62. The contact 60 is shown as connected via the conductor 63 to the pivot contact 64 for the switch arm 58 which has its other end arranged to move alternately between a pair of spaced contacts 65 and 66. The heater control conductor 36 is connected to the contact 65. The temperature measuring instrumentation conductor 38 is connected to the contact 66. The switch arm 57 is pivoted to the contact 67 and the other end of this arm moves between a pair of spaced contacts 68 and 69. The contact 69 is dead. The contact 68 is connected to the lead wire 27 for the thermocouple $T_2$. The other lead wire 26 of this thermocouple is connected to the contact 61. The contact 62 is connected via the conductor 70 to the pivot contact 67 to which the lead wire 24 for the thermocouple $T_1$ is shown as also connected. The other lead wire 25 of the thermocouple $T_1$ is shown as connected to a pivot contact 71 for the switch arm 59 the other end of which is movable between a pair of fixed contacts 72 and 73. The contact 72 is shown is being connected to the heater control conductor 37. The conductor 39 for the temperature measuring instrumentation means 40 is connected to the contact 73.

As shown in FIG. 6, the switch arms 56 and 58 place the lead wire 26 for the thermocouple $T_2$ in series with the heater control conductor 36. The switch arm 59 places the lead wire 25 for the thermocouple $T_1$ in series with the other heater control conductor 37. The switch arm 57 connects the contacts 67 and 68 whereby the lead wire 24 for the thermocouple $T_1$ is placed in series with the lead wire 27 for the thermocouple $T_2$. The thermocouples $T_1$ and $T_2$ are arranged in opposed series so that the voltage of one subtracts from the voltage of the other. Thus, the voltage across the heater control conductors 36 and 37 is the algebraic sum of the voltages measured separately by the thermocouples $T_1$ and $T_2$. Accordingly, the thermocouples $T_1$ and $T_2$ when in such opposed series arrangement will produce a heater control signal which is proportionate to the difference, if any, between the temperatures severally sensed by these thermocouples. If these thermocouples sense the same temperature, then no heater control signal will be generated. If on the other hand, there is a difference in the temperatures severally sensed by the thermocouples a heater control signal will be generated. Through the electrical circuit associated therewith this signal is amplified and stabilized and used to control the transistor 47 which in turn controls the energization of the heater H. The phase sensitive detector means 43 is used to determine the polarity of the signal.

As the chopper 35 moves the switch arms 56–59 to the other position shown in FIG. 7, it will be seen that electrical connection of the thermocouples $T_1$ and $T_2$ with the heater control conductors 36 and 37 is broken. Instead, the thermocouple $T_1$ by itself is connected to the conductors 38 and 39 for the temperature measuring instrumentation 40. More specifically, referring to FIG. 7, it will be seen that the switch arms 56 and 58 will connect the lead wire 24 for the thermocouple $T_1$ with the conductor 38, and the switch arm 59 will connect the other lead wire 25 for this thermocouple with the other conductor 39.

From the foregoing it will be seen that during half the cycle, a heater control signal is being generated, and during the other half of the cycle the signal generated by the measuring thermocouples $T_1$ is being measured. The temperature measuring instrumentation 40 is made more complicated because of the chopper circuit but this type of measurement can be successfully achieved by using a comparative known signal, as is well understood by those skilled in the art.

FIGS. 8 and 9

A simpler arrangement of surface temperature measuring device is shown in FIGS. 8 and 9. There three thermocouples $T_3$, $T_4$ and $T_5$ are employed. The lead wires 80 and 81 of the thermocouple $T_3$ are constantly associated with a temperature measuring instrument 82 which may be a simple potentiometer. The thermocouple $T_4$ has lead wires 83 and 84 and the thermocouple $T_5$ has lead wires 85 and 86. The lead wires 84 and 85 are connected in series to place thermocouples $T_4$ and $T_5$ in opposed series and the lead wires 83 and 86 are operatively associated with an amplifier 87 in turn operatively associated as represented by the line 88 with a suitable stabilization network means generally represented by the numeral 89. This means 89 in turn is associated operatively via the control line 90 with a transistor 91 operatively associated with ground and heater H'.

The thermocouples $T_3$, $T_4$ and $T_5$ and heater H' will be formed with intermediate layers of heat pervious electric insulation to provide a sandwich construction similar to that described in connection with the invention shown in FIGS. 1–7. Preferably the hot junction of the thermocouple $T_3$ will be the lowermost element and exposed for contact with the surface the temperature of which is to be measured. The thermocouples $T_4$ and $T_5$ in superposed fashion are preferably arranged intermediate the lowermost thermocouple $T_3$ and heater H'.

In the form of the invention shown in FIGS. 8 and 9, it is preferred that the circuitry including a battery as a source of electrical energy be contained within a housing represented generally by the numeral 92 in FIG. 8 and formed as a head on the upper end of a pencil-like probe 93, the lower end of which has the thermocouple assembly adapted to be placed in contact with the surface the temperature of which is to be measured.

FIGS. 10–13

The form of surface temperature measuring device shown in FIGS. 10–13 is suitable for measuring temperatures in the range of from about ambient to about 1500° F., whereas the device shown in FIGS. 1–7 or 8–9 is suitable for measuring temperatures only up to about 1000° F.

Referring to FIG. 13, the probe 99 comprises an elongated cylindrical ceramic body 100 which is shown as having one end reduced to form a tip or platform 101 which supports a heater 102 in turn supporting a sensor represented generally by the numeral 103.

The sensor support is preferably necked down as indicated at 104 near tip 101 to isolate as much as possible sensor 103 from the main probe body 100. This body is also provided with circumferentially spaced holes 105 which extend longitudinally of the body for receiving electrical lead wires as hereinafter explained, three such holes being shown in FIG. 13, it being understood that there are three more such holes on the unseen side.

Covering tip 101 is a strip of platinum foil 0.001 inch thick by 0.040 inch wide and approximately 5/16 inch long. This strip provides heater element 102. Opposite ends of this strip 102 are suitably connected, as by spot welding and annealing, to the ends of platinum buss wires 106 and 108, one being shown in FIG. 13. These wires extend severally through two diametrically opposite holes 105 and are suitably attached to body 100 by a ceramic cement. Heater element 102 is also so cemented to body 100.

A fired ceramic coating is then formed over heater 102 and its buss wires 106 and 108.

Sensor 103 is fabricated separately before mounting on body 100. A suitable length of #36 gage Teflon-covered Alumel wire 109 is bared at one end and flattened and then bent to provide an upstanding part 110 having a horizontal end flange 111. Part 110 extends through hole 112 in a ceramic spacer 113 about 0.042 inch in diameter and about 0.010 inch thick, this hole being about 0.013 inch in diameter. A suitable length of #36 gage Teflon-covered Chromel wire 114 is bared at one end and flattened to a thickness of about 0.001 inch. This flattened end of Chromel wire 114 underlays the flattened end of Alumel wire 109 adjacent upstanding part 110 and the two wires are spot welded together to provide a hot junction of a thermocouple $T_6$.

A suitable length of #40 gage Teflon-covered Chromel wire 115 is bared in its center for about ⅛ inch and then flattened to about 0.00075 inch thick producing a flat section 116 at the midpoint of the wire about 0.015 inch wide by 0.45 inch long. Flat section 116 is spot welded at about its center to flange 111, as indicated at 118 in FIG. 11, to provide a hot junction of another thermocouple $T_7$.

Sensor 103 is then mounted on body 100 by feeding the free ends of wires 109, 114 and 115 through the remaining four holes 105. The sensor is arranged so that flat section 116 of Chromel wire 115 is remote from tip 101 and thermocouple $T_7$ is the outermost thermocouple. The lead portions of wires 109, 114 and 115 are bent to follow the contour of the probe body.

A small square 119 of mica 0.050 inch by 0.050 inch by 0.0005 inch thick is arranged between sensor 103 and heater strip 102. This sensor is centered over the tip portion of this heater strip.

A fired ceramic glaze is applied to the probe except for sensor 103.

Since the thermocouples $T_6$ and $T_7$ are physically joined together by the upstanding part 110 and the lower surface of the flattened end portion of wire 114 contacts the upper surface of mica sheet 119 the lower surface of which contacts the upper surface of heater strip 102, it will be seen that these thermocouples and heater are in conductive heat exchange relation with one another through direct contacting solid bodies.

As shown in FIG. 10, the right hand lead end of #40 gage Chromel wire 115 and the lead end of #36 Alumel wire 109 are connected to any suitable temperature readout device 120 which may be a conventional indicating or recording instrument. The left hand lead end of #40 gage Chromel wire 115 and the lead end of #36 Chromel wire 114 are shown in FIG. 10 as connected with a suitable heater controller 121 with which heater leads 106 and 108 are also operatively associated.

Heater controller 121 may be of any suitable construction for supplying energy to heater 102 in proportionate response to the differential temperature sensed by thermocouples $T_6$ and $T_7$.

As shown in FIG. 12, heater controller 121 includes a D.C. source 122, a power amplifier 123 and a D.C. amplifier 124. In the complete system diagrammed in FIG. 12, the input to heater controller 121 from probe 99 is represented by line 125 and the output of this heater controller to the probe is represented by line 126, while line 128 represents the readout signal from probe 99 to temperature readout device 120. More specifically, wires 114 and 115 in FIG. 10 represent line 125 in FIG. 12; lines 106 and 108 in FIG. 10 represent line 126 in FIG. 12; and lines 109 and 115 in FIG. 10 represent line 128 in FIG. 12.

In operation, the probe 99 is manipulated so that section 116 of sensor 103 touches a hot surface. Thermocouple $T_7$ senses a higher temperature than thermocouple $T_6$ indicating heat flow at the place of contact. This generates an unbanlance signal which amplified by D.C. amplifier 124 goes to power amplifier 123. This calls for power from D.C. power source 122. This power at any instant is proportional to the magnitude of the unbalance of the sensor. The power energizes heater 102 which heats the sensor to correct the unbalance. As the unbalance approaches zero, power amplifier 123 diminishes the energy input to heater 102 until a steady state no heat flow condition exists at the sensor. The true surface temperature by thermocouple $T_7$ is then readout by device 120. If desired, it could also be readout by thermocouple $T_6$ if this were operatively associated with device 120.

*FIG. 14*

The form of surface temperature measuring device shown in FIG. 14 is suitable for measuring higher temperatures up to about 3000° F.

The probe 130 shown in FIG. 14 comprises an elongated cylindrical ceramic body about 0.190 inch in diameter and preferably made of pure alumina which includes a tubular end part 131. Spirally wound around this tubular part 131 is a heater wire 132 preferably composed of platinum-13% rhodium.

A sensor 133 is mounted on the tip of the body of probe 130 and includes a T-shaped member 134 preferably made of platinum and shown as having a disk-shaped head 135 from the unexposed side of which an integral stem 136 projects. This stem 136 projects centrally into the bore of tubular body part 131 along the axis of heater coil 132. Three wires 138, 139 and 140 are shown as attached to member 134. Each of wires 138 and 139 is preferably made of platinum-13% rhodium and wire 140 is preferably made of platinum. The ends of wires 138 and 140 are suitably connected to head 135 on the inner or unexposed side thereof. This connection between platinum-13% rhodium wire 138 and platinum head 135 provides a hot junction $T_8$ of a thermocouple. The end of platinum-13% rhodium wire 139 is suitably connected to the inner or free end of platinum stem 136 to provide a hot junction of thermocouple $T_9$.

The opposite end or lead portions of wires extend through longitudinally extending holes provided in the probe body. Good thermal contact as well as adhesion among all parts is provided by thorium oxide cement 141 which embeds heater coil 132, stem 136 and wires 138–140.

Thus it will be seen that the thermocouples $T_8$ and $T_9$ and heater 132 are in conductive heat exchange relation with one another through direct contacting solid bodies.

The lead in ends of heater coil 132 are shown as connected by buss wires 142 and 143 to a heater controller 121a with which wires 138 and 139 are also operatively associated. This heater controller 121a is similar to heater controller 121 shown in FIG. 10.

The lead in ends of wires 138 and 140 are shown as connected by wires 144 and 145, respectively, to a temperature readout device 120a which is similar to device 120 shown in FIG. 10. Instead of using wire 140 for readout, a separate wire (not shown) connected to head 135 could be used for this purpose. If desired, temperature readout could be made utilizing thermocouple $T_9$ instead of thermocouple $T_8$.

Sensor 133 shown in FIG. 14 operates in the same manner as sensor 103 shown in FIG. 10 previously described, thermocouples $T_7$ and $T_8$ being analogous as are also thermocouples $T_6$ and $T_9$. Head 135 is the part of sensor 133 which contacts the hot surface to be tested.

Because of the high temperature to which probe 130 of FIG. 14 is subjected, this probe may be encased in a cooled holder (not shown) so that only the sensor tip is exposed. This protects the operator's hands from the high temperature and also protects the probe from thermal shock damage in coming instantly in close proximity to a hot member.

It is very desirable to have fast response characteristics in the surface temperature measuring probe because of the need to follow transiencies at times and to create negligible distortion of the temperature of the measured surface. In such a probe, response time must be balanced against fragility because to obtain high response, the mass must be minimized and this in turn leads to vulnerability to breakage or operational failures. With this in mind, the response time of the probes shown in FIGS. 1–7, 8–9 and 10–13 may be about ⅓ second whereas for the probe shown in FIG. 14 the rseponse time should be longer, say about 2 second.

It is readily apparent that the term "surface" as used herein includes the monomolecular film of a fluid, whether a liquid or gas, as well as of a solid.

From the foregoing, it will be seen that the present invention accomplishes the various objects stated. Inasmuch as modifications and changes will occur to those skilled in the art, the embodiments shown are illustrative and not limitative of the present invention, the scope of which is to be measured by the appended claims.

What is claimed is:

1. In a surface temperature measuring device, the combination comprising temperature sensing means including a part contactable with a surface the true temperature of which is to be measured and arranged to generate a measurable signal responsive to the temperature sensed; and means, including thermocouple means and heater means both in conductive heat exchange relation with each other through direct contacting solid bodies and similarly with said temperature sensing means, arranged to heat said temperature sensing means by thermal conduction so as to eliminate net heat flow between said temperature sensing means and said surface when the latter is contacted by said part.

2. In a surface temperature measuring device, the combination comprising thermocouple means including elements of dissimilar metals connected to provide a hot junction therebetween, said elements where contiguous to said junction being dimensionally broader in relation to thickness, one broad side of said junction being contactable with a surface the true temperature of which is to be measured; and means arranged on the opposite broad side of said junction, including thermocouple means and heater means both in conductive heat exchange relation with each other through direct contacting solid bodies and similarly with said elements and junction, to heat said junction by thermal conduction substantially uniformly along its length to the temperature of that portion of said surface contacted by said junction.

3. In a surface temperature measuring device, the combination comprising first thermocouple means, first insulation means, second thermocouple means, second insulation means, and heater means, all of said means being in mutual heat exchange relation and superposed in and in contact in the order named and having substantially the same width, the width of each such means being greater than its thickness in the direction of superposition, the width to thickness ratio of the superposed means exclusive of said heater means being at least twenty to one.

4. In a surface temperature measuring device, the combination comprising first thermocouple means including first elements of dissimilar metals connected to provide a first hot junction therebetween, said first elements where contiguous to said first junction being dimensionally broader in relation to thickness, one broad side of said first junction being contactable with a surface the true temperature of which is to be measured, second thermocouple means arranged in heat exchange relation with said first thermocouple means to thermally sense the temperature thereof and including second elements of dissimilar metals connected to provide a second hot junction therebetween, said second elements where contiguous to said second junction being dimensionally broader in relation to thickness, said second elements being arranged with one broad side thereof opposing and electrically insulated from that broad side of said first junction which is opposite from said one broad side thereof, said second junction being superposed in relation to said first junction, and electric heater means arranged in heat exchange relation with said second thermocouple means and including a heating element dimensionally broader in relation to thickness and having one broad side opposing and electrically insulated from that broad side of said second elements which is on the opposite side from said first elements, said heating element crossing said second junction, and means controlling the energization of said heating element in response to any difference between the temperatures severally sensed by said first and second thermocouple means.

5. In a surface temperature measuring device, the combination comprising a first thermocouple member having a first hot junction, a second thermocouple member having a second hot junction, an electric heater element, said members and element being superposed with said second member being intermediate said first member and element and with said junctions in substantial alinement and with said element extending across said second junction, said members and element severally being thinner in the direction of superposition than in transverse width and all being of substantially the same width, layers of heat pervious electric insulation severally separating and contacting on opposite sides the corresponding ones of said members and element across their full width at said junctions to provide a sandwich construction, an exposed side of said first junction being contactable with a surface the true temperature of which is to be measured, and means controlling the energization of said heating element in response to any difference between the temperatures severally sensed by said members.

6. In a surface temperature measuring device, the combination comprising a first thermocouple member having a first hot junction, a second thermocouple member having a second hot junction, an electric heater element, said members and element being superposed with said second member being intermediate said first member and element and with said junctions in substantial alinement and with said element extending across said second junction, said members and element severally being thinner in the direction of superposition than in transverse width and all being of substantially the same width, layers of heat pervious electric insulation severally separating and contacting on opposite sides the corresponding ones of said members and element across their full width at said junctions to provide a sandwich construction, an exposed side of said first junction being contactable with a surface the true temperature of which is to be measured, means arranged to measure the voltage generated by said first member and hence the temperature sensed thereby, means arranged to subtract one from the other of the voltages generated severally by said members, and means arranged to energize variably said element in response to the algebraic sum of said voltages.

7. In a surface temperature measuring device, the combination comprising a first thermocouple member having a first hot junction, a second thermocouple member having a second hot junction, an electric heater element, said members and element being superposed with said second member being intermediate said first member and element and with said junctions in substantial alinement and with said element extending across said second junction, said members and element severally being thinner in the direction of superposition than in transverse width and all being of substantially the same width, layers of heat pervious electric insulation severally separating and contacting on opposite sides the corresponding ones of said members and element across their full width at said junctions to provide a sandwich construction, an exposed side of said first junction being contactable with a surface the true temperature of which is to be measured, means for measuring the voltage generated by said first member, voltage controlled means for variably energizing said element in response to the magnitude of the control voltage, and means arranged alternately to connect said first member operatively to such measuring means and to connect said members in opposed series operatively to such energizing means.

8. In a surface temperature measuring device, the combination comprising a first thermocouple member having a first hot junction, a second thermocouple member having a second hot junction, an electric heater element, said members and element being superposed with said second member being intermediate said first member and element and with said junctions in substantial alinement and with said element extending across said second junction, said members and element severally being thinner in the direction of superposition than in transverse width and all being of substantially the same width, layers of heat pervious electric insulation severally separating and contacting on opposite sides the corresponding ones of said members and element across their full width at said junctions to provide a sandwich construction, an exposed side of said first junction being contactable with a surface the true temperature of which is to be measured, means for measuring the voltage generated by said first member, voltage controlled means for variably energizing said element in response to the magnitude of the control voltage, cyclically operated switch means arranged alternately to connect said first member operatively to such measuring means thereby to measure the temperature sensed by said first member and to connect said members in opposed series operatively to such energizing means thereby to control the latter in response to the algebraic sum of the voltages generated by said members.

9. In a surface temperature measuring device, the combination comprising first, second and third thermocouple members arranged in heat exchange relation with one another and each having a hot junction, one of said hot junctions being contactable with a surface the true temperature of which is to be measured, one of said members being arranged to thermally sense the temperature of some other one of said members, another of said members being arranged to thermally sense the temperature of some other one of said members, an electric heater element arranged in heat exchange relation with one of said members, means arranged to measure the voltage generated by one of said members, and means arranged to energize said element variably in response to the magnitude of any difference between the temperatures severally sensed by the two of said members other than the last mentioned ones thereof.

10. In a surface temperature measuring device, the combination comprising a first thermocouple member having a hot junction contactable with a surface the true temperature of which is to be measured, a second thermocouple member arranged in heat exchange relation with said first member to thermally sense the temperature thereof, a third thermocouple member arranged in heat exchange relation with said second member to thermally sense the temperature thereof, an electric heater element arranged in heat exchange relation with said third member, means arranged to measure the voltage generated by one of said members, and means arranged to energize said element variably in response to the magnitude of any difference between the temperatures severally sensed by the two of said members other than the last mentioned one thereof.

11. In a surface temperature measuring device, the combination comprising a first thermocouple member having a hot junction contactable with a surface the true temperature of which is to be measured, a second thermocouple member arranged in heat exchange relation with said first member to thermally sense the temperature thereof, a third thermocouple member arranged in heat exchange relation with said second member to thermally sense the temperature thereof, an electric heater element arranged in heat exchange relation with said third member, means arranged to measure the voltage generated by one of said first and second members, and means arranged to energize said element variably in response to the magnitude of any difference between the temperatures severally sensed by said third member and some one of said first and second members.

12. In a surface temperature measuring device, the combination comprising a first thermocouple member having a hot junction contactable with a surface the true temperature of which is to be measured, a second thermocouple member arranged in heat exchange relation with said first member to thermally sense the temperature thereof, a third thermocouple member arranged in heat exchange relation with said second member to thermally sense the temperature thereof, an electric heater element arranged in heat exchange relation with said third member, means arranged to measure the voltage generated by said first member and hence the temperature sensed thereby, and means arranged to energize said element variably in response to the magnitude of any difference between the temperatures severally sensed by said second and third members.

13. In a surface temperature measuring device, the combination comprising a first thermocouple member having a first hot junction, a second thermocouple member having a second hot junction, a third thermocouple member having a third hot junction, an electric heater element, said members and element being superposed in the order named and with said junctions in substantial alinement and with said element extending across said third junction, said members and element severally being thinner in the direction of superposition than in transverse width and all being of substantially the same width, layers of heat pervious electric insulation severally separating and contacting on opposite sides the corresponding ones of said members and element across their full width to provide a sandwich construction, an exposed side of said first junction being contactable with a surface the true temperature of which is to be measured, and means arranged to energize said element variably in response to the magnitude of any difference between the temperatures severally sensed by said second and third members.

14. In a surface temperature measuring device, the combination comprising a first thermocouple member having a hot junction contactable with a surface the true temperature of which is to be measured, a second thermocouple member arranged in heat exchange relation with said first member to thermally sense the temperature thereof, a third thermocouple member arranged in heat exchange relation with said second member to thermally sense the temperature thereof, an electric heater element arranged in heat exchange relation with said third member, means arranged to measure the voltage generated by said first member and hence the temperature sensed thereby, means arranged to subtract one from the other of the voltages generated severally by said second and third members, and means arranged to energize said element variably in response to the magnitude of the algebraic sum of said voltages.

15. In a surface temperature measuring device, the combination comprising a first thermocouple member having a first hot junction, a second thermocouple member having a second hot junction, a third thermocouple member having a third hot junction, an electric heater element, said members and element being superposed in the order named and with said junctions in substantial alinement and with said element extending across said third junction, said members and element severally being thinner in the direction of superposition than in transverse width and all being of substantially the same width, layers of heat pervious electric insulation severally separating and contacting on opposite sides the corresponding ones of said members and element across their full width to provide a sandwich construction, an exposed side of said first junction being contactable with a surface the true temperature of which is to be measured, means arranged to measure the voltage generated by said first member and hence the temperature sensed thereby, means connecting said second and third members in opposed series relation thereby to subtract one from the other of the voltages generated severally by said second and third members, and means arranged to energize said element variably in response to the magnitude of the algebraic sum of said voltages.

16. In a surface temperature measuring device, the combination comprising first thermocouple means including two elements of dissimilar metals connected to provide a first hot junction therebetween, second thermocouple means including a third element connected with one of said two elements to provide a second hot junction therebetween, said third element being of a metal dissimilar to that of said one of said two elements, one of said thermocouple means being contactable with a surface the true temperature of which is to be measured, and heater means arranged in conductive heat exchange relation with one of said thermocouple means through direct contacting solid bodies to heat such one of said thermocouple means by thermal conduction to the temperature of the other.

17. In a surface temperature measuring device, the combination comprising first termocouple means including two elements of dissimilar metals connected to provide a first hot junction therebetween, second thermocouple means including a third element connected with one of said two elements to provide a second hot junction therebetween, said third element being of a metal dissimilar to that of said one of said two elements, one of said thermocouple means being contactable with a surface the true temperature of which is to be measured, and heater means arranged in conductive heat exchange relation with one of said thermocouple means through direct contacting solid bodies to heat such one of said thermocouple means by thermal conduction in response to the temperature differential sensed by both said thermocouple means.

18. In a surface temperature measuring device, the combination comprising first thermocouple means including two elements of dissimilar metals connected to provide a first hot junction therebetween, second thermocouple means including a third element connected with one of said two elements to provide a second hot junction therebetween, said third element being of a metal dissimilar to that of said one of said two elements, one of said thermocouple means being contactable with a surface the true temperature of which is to be measured, heater means arranged in conductive heat exchange relation with one of said thermocouple means through direct contacting solid bodies to heat such one of said thermocouple means by thermal conduction in response to the temperature differential sensed by both said thermocouple means, and means for reading out the temperature sensed by one of said thermocouple means, whereby after said temperature differential is eliminated the temperature readout is said true temperature of said surface.

19. In a surface measuring probe, the combination comprising an elongated ceramic body reduced at one end to provide a tip, a flat heater element covering said tip, and sensor means mounted on said heater element including two thermocouple elements of dissimilar metals connected to provide a first hot junction arranged over said heater element, one of said thermocouple elements having a part which extends in a direction longitudinally of said body outwardly from said tip, a ceramic spacer surrounding said part and a third thermocouple element connected to said part end of a metal dissimilar to that of said part to provide a second hot junction on the side of said spacer opposite from that on which said first hot junction is arranged, all of said elements severally having leads which extend along said body in a direction away from said tip.

20. In a surface measuring probe, the combination comprising an elongated ceramic body having a tip, an annular heating coil embedded in said body adjacent said tip and having its axis extending longitudinally of said body, and sensor means mounted on said body including a first thermocouple element having an enlarged head arranged on said tip and a stem extending from the unexposed side of said head inwardly of said body and generally along said axis, a second thermocouple element embedded in said body and connected to said head on said unexposed side thereof and of a metal different from that of said first thermocouple element to provide a first hot junction and a third thermocouple element embedded in said body and connected to said stem and of a metal different from that of said first thermocouple element to provide a second hot junction.

References Cited

UNITED STATES PATENTS

| | | | |
|---|---|---|---|
| 2,466,274 | 4/1949 | Ray | 136—227 |
| 3,099,100 | 7/1963 | Werner et al. | 73—342 |

OTHER REFERENCES

Publication: Industrial and Engineering Chemistry, (IEC) volume 18 No. 7, pp. 728 and 729.

LOUIS R. PRINCE, *Primary Examiner.*

D. M. YASICH, *Examiner.*

UNITED STATES PATENT OFFICE
CERTIFICATE OF CORRECTION

Patent No. 3,321,974                                May 30, 1967

Gerald A. Sterbutzel

It is certified that error appears in the above identified patent and that said Letters Patent are hereby corrected as shown below:

Column 2, line 50, strike out "means movably mounting said armature; said armature"; column 7, line 75, for "unbanlanced" read -- unbalanced --; column 9, line 10, for "second" read -- seconds --; column 13, line 26, for "termocouple" read -- thermocouple --.

This certificate supersedes Certificate of Correction issued April 16, 1968.

Signed and sealed this 12th day of August 1969.

(SEAL)
Attest:

Edward M. Fletcher, Jr.

Attesting Officer

WILLIAM E. SCHUYLER, JR.

Commissioner of Patents